United States Patent [19]

Li

[11] Patent Number: 5,515,242
[45] Date of Patent: May 7, 1996

[54] DOUBLE CONFOCAL FIBER OPTIC LIGHT COLLECTOR

[75] Inventor: John X. Li, Ann Arbor, Mich.

[73] Assignee: Ford Motor Company, Dearborn, Mich.

[21] Appl. No.: 316,756

[22] Filed: Oct. 3, 1994

[51] Int. Cl.⁶ .................................................... F21V 7/04
[52] U.S. Cl. ........................... 362/32; 362/298; 362/299; 362/346
[58] Field of Search .................................. 385/31; 362/26, 362/27, 32, 297, 298, 299, 343, 346

[56] References Cited

U.S. PATENT DOCUMENTS

| | | | |
|---|---|---|---|
| 3,772,506 | 11/1973 | Junginger . | |
| 4,755,918 | 7/1988 | Pristash et al. | 362/301 |
| 5,271,077 | 12/1993 | Brockman et al. | 385/31 |
| 5,321,586 | 6/1994 | Hege et al. | 362/32 |
| 5,436,805 | 7/1995 | Hsu et al. | 362/32 |
| 5,475,571 | 12/1995 | Dassanayake | 362/32 |

FOREIGN PATENT DOCUMENTS

| | | |
|---|---|---|
| 1383413 | 11/1964 | France . |
| 561922 | 10/1932 | Germany . |
| 249811 | 10/1988 | Japan . |
| 211705 | 8/1989 | Japan . |

*Primary Examiner*—Stephen F. Husar
*Attorney, Agent, or Firm*—K. G. Mierzwa; R. L. May

[57] ABSTRACT

A light collector includes a light source and a first and a second primary elliptical reflector partially surrounding the light source. The first and second primary reflectors have a common focal point at the light source. The first and second primary elliptical mirrors each have an opening in which a first light pipe and a second light pipe are located. Each of the light pipes having a face with a known acceptance angle. Each face is located substantially at the focal point of one of the primary reflectors. The first and second reflectors have an eccentricity sufficient to reflect light from the first and second primary reflectors so that light incident on the face of the light pipes does not exceed the acceptance angle of the light pipe. The first and second secondary elliptical reflectors are located within the opening in the primary mirrors. The first and second reflectors have common focal points with said first and second primary mirrors, respectively. The reflectors have an eccentricity and location by which light reflected from the secondary mirrors does not intersect the light source.

16 Claims, 1 Drawing Sheet

DOUBLE CONFOCAL FIBER OPTIC LIGHT COLLECTOR

CROSS REFERENCE TO A RELATED APPLICATION

The present application is related to U.S. patent application Ser. No. 08/116,146 of which the inventors of the present application are joint inventors.

BACKGROUND OF THE INVENTION

The present invention relates to a light collector for coupling light into fiber optic light pipes and more specifically to a collector having primary mirrors and secondary mirrors in a double confocal arrangement.

In the design of light coupling devices gains in light collector efficiency are essential to the commercial success of light distribution systems such as a central lighting system in an automobile. One consideration designing light collectors is shaping the reflective surfaces to direct light to a light transmission medium in the most efficient manner. Another consideration is shaping light collectors to meet packaging sizes. However, shaping for efficiency and overall package size often presents opposing goals.

In prior art FIG. 1, a known light collector has a pair of primary mirrors 110 with a common focal point 112. Each primary mirror 110 also has a second focal point 114 and 114' located at the center of a face of fiber optic light pipes 116 and 116' respectively. One problem this design is the inefficiency of light lost in the space between light pipes 116 and 116' and primary mirrors 110.

SUMMARY OF THE INVENTION

It was surprisingly found that adding an additional pair of mirrors around the light pipe significantly increased the light collector efficiency.

According to the invention a light collector includes a light source and a first and a second primary elliptical reflector partially surrounding the light source. The first and second primary reflectors have a common focal point at the light source. The first and second primary elliptical mirrors each have an opening in which a first light pipe and a second light pipe are located. Each of the light pipes having a face with a known acceptance angle. Each face is located substantially at the focal point of one of the primary reflectors. The first and second reflectors have an eccentricity sufficient to reflect light from the first and second primary reflectors so that light incident on the face of the light pipes does not exceed the acceptance angle of the light pipe. The first and second secondary elliptical reflectors are located within the opening in the primary mirrors and have common focal points with the first and second primary mirrors, respectively.

DETAILED DESCRIPTION OF THE PREFERRED EMBODIMENT

Figure 1:
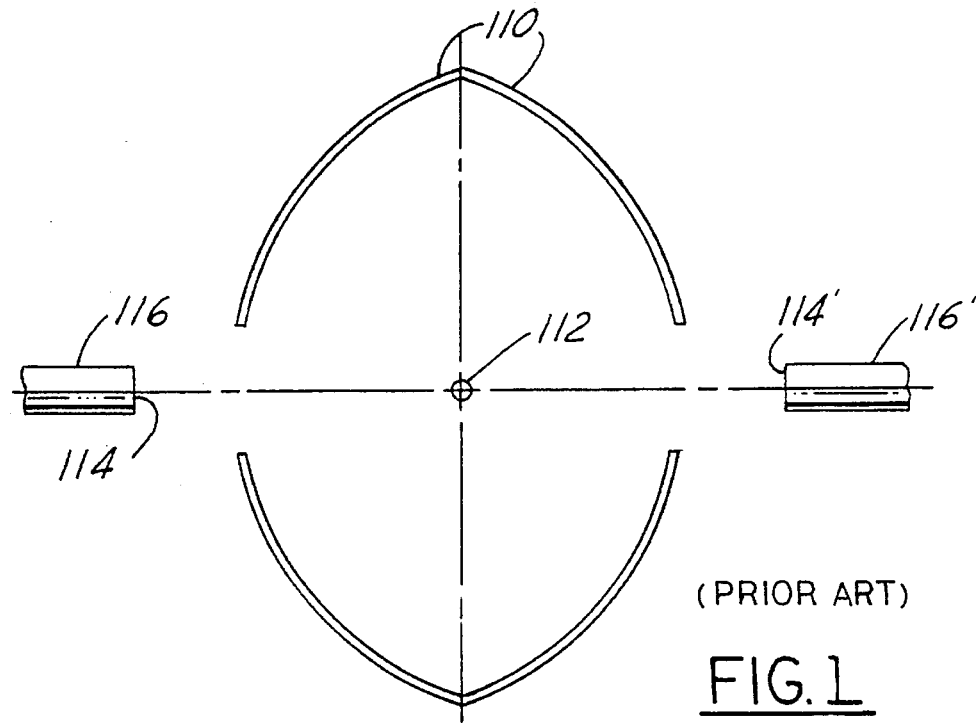
FIG. 1 is a cross sectional view of prior art.
Figure 2:
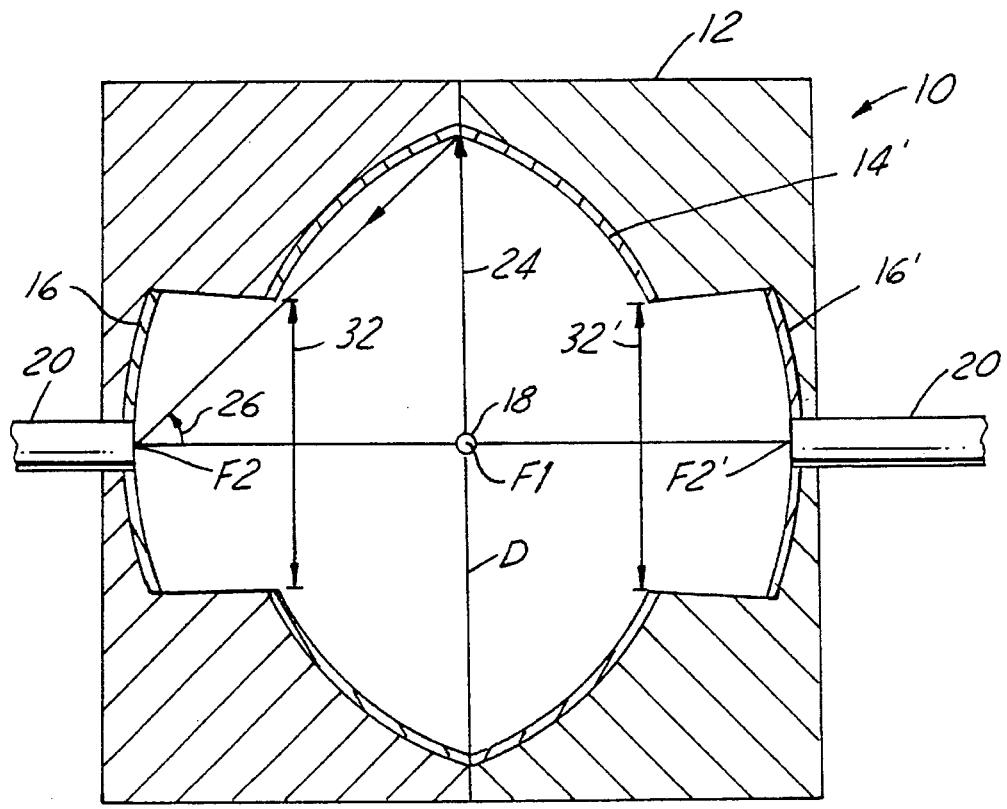
FIG. 2 is a cross sectional view of a light collector according to the present invention.

Referring to FIG. 2, a light collector 10 is secured within a housing 12. Housing 12 is preferably manufactured in two pieces and later assembled. Light collector 10 is generally comprised of a pair of oppositely facing primary mirrors 14 and 14' and a pair of secondary mirrors 16 and 16' fixed relative to housing 12. Each pair of mirrors are positioned to reflect light from a light source 18 to a pair of light pipes 20 and 20'. Light collector 10 is symmetrical about both the major axis 22 and minor axis 24. All the mirrors are preferably coated with a reflective coating that reflects only visible light and allows ultraviolet and infrared light to pass through to prevent the accumulation of heat between the mirrors.

Primary mirrors 14 and 14' are elliptical in shape and have a common focal point $F_1$. The second focal point of primary mirrors 14 and 14' is $F_2$ and $F_2'$, respectively, which are preferably located at the center points of light pipe 20 and 20' which is circular in cross section. The eccentricity of the mirrors is related to the magnification of the image of filament on the face of light pipe 20. For the most efficient light collector, a smaller image at the face of the light pipe is preferred. The eccentricity ($e_p$) of primary mirror 14 and 14' is preferably less than one third to ensure a low magnification of the filament.

Secondary mirror 16 is also elliptical in shape and shares common focal points with primary mirror 14. Primary mirrors 14 and 14' intersect at point 30. The eccentricity of secondary mirror 16 is preferably about one third and can be shaped so that light does not substantially go through light source 18. The formula for the diameter D of the collector is:

$$D = b_p(1-e_p^2)$$

where $b_p$ is the minor axis and $e_p$ is the eccentricity of primary mirror 14. In configurations using only one pair of mirrors as a collector, the collector reflects light at angles greater than the acceptance or an opening in the collector is so big around the light pipe that a significant portion of light is not reflected.

A light source 18 which is located at common focal point $F_1$ can be any variety of lamps including a common filament type or an arc discharge lamp. In either case, the light discharging mechanism is preferably oriented along minor axis 24. Satisfactory results have been obtained with a filament 5 mm in length. A small filament is preferred especially if the light intensity is maintained. A small filament is also preferred if the mirrors magnify the image of the filament on the face of light pipe 20.

Light pipe 20 has an acceptance angle 26 at which angle and smaller angles light directed to the face of light pipe 20 are accepted into light pipe 20 and transmitted through light pipe 20. Light incident on the face of light pipe 20 having an angle greater than the acceptance angle are not transmitted through light pipe 20. The preferred light acceptance angle is about 38° since light the output from light pipe 20 also exits at the light acceptance angle. The exiting light, for example, forms the width and length of an illuminated patch in front of an automobile if the collector apparatus is used in a forward lighting system. Light pipe 20 preferably has a diameter of about 7 mm and has a single strand or a multi-strand bundle.

Primary mirror 14 is shaped to allow a light ray emitted from light source 18 and reflecting from a point on primary mirror 14 on either side of intersection point 30 to be within the acceptance angle 26 of light pipes 20 and 20'. To accomplish this, the geometry of the face of light pipe 20 and the primary mirror 14 are not flush, i.e., the face of light pipe 20 is positioned further from light source 18 than primary mirror 14. In order for primary mirror 14 not to obstruct light reflecting from primary mirror 14 near the intersection points 30 from reaching light pipe 20, an opening 32 centered about major axis 22 is formed in primary mirror 14. Opening 32 has a radius $R_h$ given by the formula:

$$R_h = \frac{6e_p^2 b_p \sqrt{1-e_p^2} \pm \sqrt{18e_p^4 - 12e_p^2 + 1}}{6e_p^2 - 2}$$

where $e_p$ is the eccentricity of said primary mirrors and $b_p$ is the minor axis of said primary mirror.

Secondary mirrors 16 and 16' are preferably placed within opening 32 and are located flush with the face of light pipes 20. Light rays reflected from secondary mirrors 16 and 16' are incident on the face of light pipes 20 and 20' at an angle less than the acceptance angle. In has been found that the secondary mirrors 16 and 16' significantly increase the efficiency of the light collector.

Various modifications and alterations of the present invention will no doubt occur to those skilled in the art to which this invention pertains. These and all other variations which rely upon the teachings by which this disclosure has advanced the art are properly considered within the scope of the invention as defined by the claims.

What is claimed is:

1. A light collector comprising:

a light source;

a first and a second primary elliptical reflector partially surrounding said light source, said first and second primary reflectors having a common focal point at said light source, said first and second primary elliptical mirrors each having an opening;

a first light pipe and a second light pipe each located within one of said openings, each of said light pipes having a face with a known acceptance angle, each face located substantially at the focal point of one of said primary reflectors;

said first and second reflectors having an eccentricity sufficient to reflect light from said first and second primary reflectors so that light incident on the face of said light pipes does not exceed the acceptance angle of the light pipe; and a first and second secondary elliptical reflector located within said opening in said primary mirror, said first and second reflectors having common focal points with said first and second primary mirrors respectively, said secondary reflectors having an eccentricity sufficient to reflect light from said first and second secondary reflectors so that light incident on the face of said light pipes does not exceed the acceptance angle of the light pipe.

2. A light collector as claimed in claim 1 wherein said first focal point and second focal points are collinear forming an axis.

3. A light collector as claimed in claim 2 wherein said light source comprises a filament.

4. A light collector as claimed in claim 3 orientation of the filament perpendicular to said axis.

5. A light collector as claimed in claim 1 wherein said eccentricity of said primary mirror is less than one third.

6. A light collector as claimed in claim 1 wherein the eccentricity of the secondary mirror is about one third.

7. A light collector as claimed in claim 1 wherein the radius $R_h$ of said opening is defined by the formula:

$$R_h = \frac{6e_p^2 b_p \sqrt{1-e_p^2} \pm \sqrt{18e_p^4 - 12e_p^2 + 1}}{6e_p^2 - 2}$$

where $e_p$ is the eccentricity of said primary mirrors and $b_p$ is the minor axis of said primary mirror.

8. A light collector as claimed in claim 1 wherein said reflective surface does not reflect ultraviolet light or infrared light.

9. A light collector comprising:

a housing comprising two parts;

a light source;

a first and a second primary elliptical reflector, each of said primary elliptical mirrors supported by a respective part of said housing, said first and second primary reflectors having a common focal point at said light source, and a second focal point, said first and second primary elliptical mirrors each having an opening;

a first light pipe and a second light pipe each fastened to one part of said housing located within one of said openings, each of said light pipes having a face with a known acceptance angle, each face located substantially at the focal point of one of said primary reflectors;

said first and second primary reflectors having an eccentricity sufficient to reflect light from said first and second primary reflectors so that light incident on the face of said light pipes does not exceed the acceptance angle of the light pipe; and a first and second secondary elliptical reflector, each located within said opening in said primary mirror and formed in said housing, said first and second reflectors having common focal points with said first and second primary mirrors respectively.

10. A light collector as claimed in claim 9 wherein said first focal point and second focal points are collinear forming an axis.

11. A light collector as claimed in claim 10 wherein said light source comprises a filament.

12. A light collector as claimed in claim 11 orientation of the filament perpendicular to said axis.

13. A light collector as claimed in claim 9 wherein said eccentricity of said primary mirror is less than one third.

14. A light collector as claimed in claim 9 wherein the eccentricity of the secondary mirror is about one third.

15. A light collector as claimed in claim 14 radius Rh of said opening is defined by the formula:

$$R_h = \frac{6e_p^2 b_p \sqrt{1-e_p^2} \pm \sqrt{18e_p^4 - 12e_p^2 + 1}}{6e_p^2 - 2}$$

where $e_p$ is the eccentricity of said primary mirrors and $b_p$ is the minor axis of said primary mirror.

16. A light collector as claimed in claim 9 wherein said reflective surface does not reflect ultraviolet light or infrared light.

* * * * *